US012530216B1

(12) United States Patent
Kumar

(10) Patent No.: US 12,530,216 B1
(45) Date of Patent: Jan. 20, 2026

(54) MULTIMEDIA TERMINAL SYSTEM FOR MULTIPLE USERS ON A SINGLE COMPUTING PLATFORM

(71) Applicant: Innominds Software, Inc., San Jose, CA (US)

(72) Inventor: Shree Kumar, Karnataka (IN)

(73) Assignee: INNOMINDS SOFTWARE, INC., San Jose, CA (US)

(*) Notice: Subject to any disclaimer, the term of this patent is extended or adjusted under 35 U.S.C. 154(b) by 860 days.

(21) Appl. No.: 17/832,534

(22) Filed: Jun. 3, 2022

(51) Int. Cl.
G06F 9/455 (2018.01)

(52) U.S. Cl.
CPC ........... G06F 9/45558 (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 2017/0019705 | A1* | 1/2017 | Rozendaal | H04N 5/765 |
| 2018/0338103 | A1* | 11/2018 | McCall | G09B 9/24 |
| 2022/0165198 | A1* | 5/2022 | Bogdanowicz | G09G 3/346 |

* cited by examiner

*Primary Examiner* — Eric C Wai
(74) *Attorney, Agent, or Firm* — Knowmad Law

(57) ABSTRACT

A multimedia terminal system for multiple users on a single computing platform. The system takes images from a conventional graphical processing unit on a computing device, multiplexes it on the computing platform into one or more vertical strips each containing the display area of one or more of the independent terminals. The strips are "packed" onto a single logical image, sent on a single cable to a hub with an integrated circuit that demultiplexes the signal back into the independent display signals for each independent terminal.

21 Claims, 18 Drawing Sheets

|  | Sample | 0 | 1 | 2 | 3 ... |
|---|---|---|---|---|---|
|  | Byte |  |  |  |  |
| Channel 0 | 0 | 0x07 | 0x47 | 0x07 | 0x47 |
|  | 1 | T1, Left | T6, Right | T1, Left | T6, Right |
|  | 2 | T1, Left | T7, Left | T1, Left | T7, Left |
| Channel 1 | 3 | T1, Right | T7, Left | T1, Right | T7, Left |
|  | 4 | T1, Right | T7, Right | T1, Right | T7, Right |
|  | 5 | T2, Left | T7, Right | T2, Left | T7, Right |
| Channel 2 | 6 | T2, Left | T8, Left | T2, Left | T8, Left |
|  | 7 | T2, Right | T8, Left | T2, Right | T8, Left |
|  | 8 | T2, Right | T8, Right | T2, Right | T8, Right |
| Channel 3 | 9 | T3, Left | T8, Right | T3, Left | T8, Right |
|  | 10 | T3, Left | Unused | T3, Left | Unused |
|  | 11 | T3, Right | Unused | T3, Right | Unused |
| Channel 4 | 12 | T3, Right | Unused | T3, Right | Unused |
|  | 13 | T4, Left | Unused | T4, Left | Unused |
|  | 14 | T4, Left | Unused | T4, Left | Unused |
| Channel 5 | 15 | T4, Right | Unused | T4, Right | Unused |
|  | 16 | T4, Right | Unused | T4, Right | Unused |
|  | 17 | T5, Left | Unused | T5, Left | Unused |
| Channel 6 | 18 | T5, Left | Unused | T5, Left | Unused |
|  | 19 | T5, Right | Unused | T5, Right | Unused |
|  | 20 | T5, Right | Unused | T5, Right | Unused |
| Channel 7 | 21 | T6, Left | Unused | T6, Left | Unused |
|  | 22 | T6, Left | Unused | T6, Left | Unused |
|  | 23 | T6, Right | Unused | T6, Right | Unused |

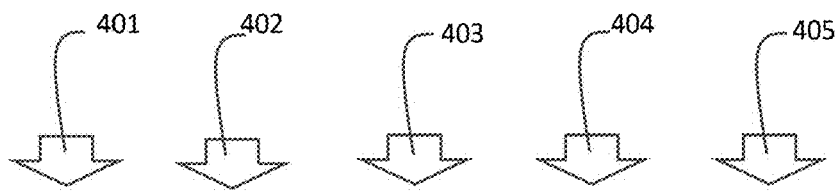

FIG 4

|  | Sample | 0 | 1 | ... |
| --- | --- | --- | --- | --- |
|  | Byte |  |  |  |
| Channel 0 | 0 | T1, Left | T1, Left |  |
|  | 1 | T1, Left | T1, Left |  |
|  | 2 | T1, Right | T1, Right |  |
|  | 3 | T1, Right | T1, Right |  |
| Channel 1 | 4 | T2, Left | T2, Left |  |
|  | 5 | T2, Left | T2, Left |  |
|  | 6 | T2, Right | T2, Right |  |
|  | 7 | T2, Right | T2, Right |  |
| Channel 2 | 8 | T3, Left | T3, Left |  |
|  | 9 | T3, Left | T3, Left |  |
|  | 10 | T3, Right | T3, Right |  |
|  | 11 | T3, Right | T3, Right |  |
| Channel 3 | 12 | T4, Left | T4, Left |  |
|  | 13 | T4, Left | T4, Left |  |
|  | 14 | T4, Right | T4, Right |  |
|  | 15 | T4, Right | T4, Right |  |
| Channel 4 | 16 | T5, Left | T5, Left |  |
|  | 17 | T5, Left | T5, Left |  |
|  | 18 | T5, Right | T5, Right |  |
|  | 19 | T5, Right | T5, Right |  |
| Channel 5 | 20 | T6, Left | T6, Left |  |
|  | 21 | T6, Left | T6, Left |  |
|  | 22 | T6, Right | T6, Right |  |
|  | 23 | T6, Right | T6, Right |  |
| Channel 6 | 24 | T7, Left | T7, Left |  |
|  | 25 | T7, Left | T7, Left |  |
|  | 26 | T7, Right | T7, Right |  |
|  | 27 | T7, Right | T7, Right |  |
| Channel 7 | 28 | T8, Left | T8, Left |  |
|  | 29 | T8, Left | T8, Left |  |
|  | 30 | T8, Right | T8, Right |  |
|  | 31 | T8, Right | T8, Right |  |

FIG 5

| Source Row | Source Terminal | Target Row of vertical strip |
|---|---|---|
| 1 | 1 | 1 |
| 1 | 2 | 2 |
| 1 | 3 | 3 |
| 2 | 1 | 4 |
| 2 | 2 | 5 |
| 2 | 3 | 6 |
| | | ... |
| Y | 1 | 3*Y - 2 |
| Y | 2 | 3*Y - 1 |
| Y | 3 | 3*Y |

FIG 14

| Row of image | Left half (1366 pixels) | Right half (1366 pixels) |
|---:|---|---|
| 1 | Pixels of row 1 of Terminal 1 | Pixels of row 1 of Terminal 4 |
| 2 | Pixels of row 1 of Terminal 2 | Pixels of row 1 of Terminal 5 |
| 3 | Pixels of row 1 of Terminal 3 | Pixels of row 1 of Terminal 6 |
| 4 | Pixels of row 2 of Terminal 1 | Pixels of row 2 of Terminal 4 |
| 5 | Pixels of row 2 of Terminal 2 | Pixels of row 2 of Terminal 5 |
| 6 | Pixels of row 2 of Terminal 3 | Pixels of row 2 of Terminal 6 |
| ... | ... | ... |
| ... | ... | ... |
| 2302 | Pixels of row 768 of Terminal 1 | Pixels of row 768 of Terminal 4 |
| 2303 | Pixels of row 768 of Terminal 2 | Pixels of row 768 of Terminal 5 |
| 2304 | Pixels of row 768 of Terminal 3 | Pixels of row 768 of Terminal 6 |

FIG 15

| Pixel | 0 | 1 | 2 | 3 | 4 | 5 | 6 | 7 | 8 | 9 | 10 | 11 | 12 | 13 | 14 | 15 | ... | 1560 | 1561 | 1562 | 1563 | ... | 1916 | 1917 | 1918 | 1919 |
|---|---|---|---|---|---|---|---|---|---|---|---|---|---|---|---|---|---|---|---|---|---|---|---|---|---|---|
| Row | | | | | | | | | | | | | | | | | | | | | | | | | | |
| 1 | P0,0 | P1,0 | P2,0 | P3,0 | P0,0 | P1,0 | P2,0 | P3,0 | P0,0 | P1,0 | P2,0 | P3,0 | P0,0 | P1,0 | P2,0 | P3,0 | | | | | | | P0,0 | P1,0 | P2,0 | P3,0 |
| 2 | | | | | | | | | | | | | | | | | | | | | | | | | | |
| 3 | | | | | | | | | | | | | | | | | ... | P0,1 | P1,1 | P2,1 | P3,1 | ... | | | | |
| 4 | | | | | | | | | | | | | | | | | | | | | | | | | | |

FIG 16

MULTIMEDIA TERMINAL SYSTEM FOR MULTIPLE USERS ON A SINGLE COMPUTING PLATFORM

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The present invention relates generally to video displays for computing and multimedia.

BACKGROUND OF THE INVENTION

Existing interactive computer systems broadly adhere to the principle of one "physical" user per system. Typically, a single display/monitor is available for each independent user. Existing technology allows for "multi-headed" apparatus, thus allowing multiple monitors per system. However, the information on these multiple monitors is typically intended for and consumed by one physical user. Common examples would be a desktop PC with one or more monitors, a laptop, a smartphone, or a tablet.

In this document, we refer to "multi-head" as one user having access to multiple monitors (heads) on a single computing platform. Whereas "multi-seat" is defined as multiple users on a single computing platform, each having at least one monitor (head) with input and output. There are a number of multi-head solutions in the art that are described in this section. The present invention is multi-seat and will be described in subsequent sections.

In terms of delivering content (but not interactivity) to multiple users, both HDMI and DisplayPort systems provide this capability. With HDMI, two independent displays with separate content are supported. HDMI uses an interleave pattern of alternate pixels, alternate scanlines, or side by side scanlines per display.

DisplayPort provides a "display chaining" method where a single cable originating from a PC/GPU can be connected to multiple monitors showing independent content. This is supported by a feature called "MultiStream Transport" (MST) in the DisplayPort standard. The PC/GPU must MST compatible and the monitors must be MST compatible with support for display chaining (https://www.tripplite.com/products/multi-stream-transport-mst-hub-technology). This feature is typically provided only in high end DisplayPort monitors. An alternate method is to use an MST "hub".

VDI (Virtual Desktop Infrastructure) is a popular way to host the desktop sessions of multiple users on a single host. Apart from session management, this employs a typical client/server architecture. A server program running on the host manages user sessions and applications. A client program running on the user's physical computer provides access to the session over a standard network (e.g. over the internet, local LAN, etc.). The server and client program typically use a compression algorithm to reduce the amount of data to be transferred over the network. Many commercial solutions are available, from Citrix, Microsoft, HP, NVIDIA among others.

These solutions are typically optimized to reduce resource usage on the client side. In many cases, "thin-clients" with very less memory, and a less-powerful CPU can also be used. However, on the server side they consume significant CPU resources to optimize network bandwidth. In some cases, solutions may require specific accelerators (e.g. a GPU/graphics card) to work. This solution is resource intensive in other ways, e.g. significant power may be consumed on the server side.

An alternative that is closer to multi-seat is the Windows Multipoint Server (WMS) that is implemented similarly to X Windows. WMS has the ability to associate a specific head to two users, with independent input. Similar solutions have been implemented on X Windows using Xephr as well. (Xephr is a nested X server, see https://en.wikibooks.org/wiki/Multiseat_Configuration/Xephyr). The referenced article discloses assigning input devices to each nested X server.

Multimedia capabilities of computers have grown quickly in the past few years. The maximum resolution and capability of the display interface has grown due to the demand for multimedia and graphical applications of all types. A common PC system now supports at-least one interface capable of supporting 4K resolution @60 Hz. Higher resolutions, such as 5K and 8K, are also finding adoption and support. However, not all users have a need for these advanced capabilities. Many laptop and desktop screens are still as low as 720p (1280×720) or 1366×768 ("HD") resolution. Similarly, it is common to see tablet screens around 720p resolution and below (1024×600). Even lower resolution displays down to 800×480 and 640×480 (VGA) are in common use as well in various application areas.

The situation is similar in the case of audio. HDMI and DisplayPort standards allow for multi-channel audio at high data rates (e.g. 8 channels at 192 kHz, 32 channels at 1536 kHz). This kind of hi-fi audio is useful in applications centered around high-end entertainment/gaming. However, for "normal" interactive desktop usage, 48 kHz stereo (2 channel), 16 bit audio is sufficient for one user. Audio does not need high bandwidth. Therefore, if the GPU does not support higher capabilities of audio, it is easily possible to add audio with a USB connection that provides adequate bandwidth to cover the requirements.

BRIEF SUMMARY OF THE INVENTION

Given the ever-increasing capabilities of modern computing and peripheral hardware, and the fact that many users and applications simply do not require capabilities to that extent, what is needed is a system that leverages these advanced capabilities for applications with (a) lower resource demands and (b) multiple simultaneous but independent users on a single system, and that is also (c) inexpensive, and (d) highly customizable on any hardware configuration.

With custom hardware setup and software, it is possible to enable one user per monitor. Each user interacts with their independent display with an independent, separate set of input devices (e.g. keyboard, mouse, touchscreen). In these cases, individual monitors are attached to the host system using a cable (typically HDMI or DisplayPort). Examples include a desktop PC connected to two monitors running Linux, multi-head X server setup.

The present invention is designed for the specific case where the users are co-located with the host system, e.g. a classroom, computer laboratory, kiosks, etc. The invention includes a multiplexer on the host computer that "packs" video and audio onto a single cable. In an alternate embodiment, the audio may be packed onto a separate cable, e.g.

USB audio card. This is connected to an external "hub" that unpacks the video and audio streams, passing each individual stream to its respective monitor.

The advantages of the invention over existing methods are:
- Compatibility with and builds on popular industry standards, specifically HDMI and DisplayPort.
- Providing a scalable approach where usage of the available system resources is maximized.
- Lowering cost per user. It can deliver high frame rates without requiring specific image compression hardware. CPU and storage are not required on the terminal. A variety of image interleaving schemes can be used to simplify the implementation of the hub.
- Lowering power consumption. The server side does not need to "compress" images, and the client side does not need to "decompress". This can lead to lower operational costs.
- Suitability for highly interactive applications, smooth video without dropping frames.
- Increased security because the user's desktop session is not exposed over any network.
- Simplifies configuration of interactivity and audio by directly associating them with displays
- Simplified cable management due to the multiplexing of audio, video and interactivity into fewer cables, compared to alternatives.

BRIEF DESCRIPTION OF THE DRAWINGS

FIG. 4 is a table showing the encoding for 48 kHz, stereo, 16 bits per sample audio for 8 terminals in a 96 kHz 8 channel, 24 bits per sample audio stream.

FIG. 5 is a table showing the encoding for 48 kHz, stereo, 16 bits per sample audio for 8 terminals in a 48 kHz 8 channel, 32 bits per sample audio stream.

FIG. 14 shows how a hub handles the video of an incoming frame.

FIG. 15 shows an examples of the "packed by row" method for three terminals.

FIG. 16 shows the row-wise interleaving scheme for 6 displays corresponding to method 1 for interleaving pixel packing.

DETAILED DESCRIPTION OF THE INVENTION

This invention enables multiple physically connected interactive users to be hosted over a single display output (including but not limited to HDMI, DVI, embedded DisplayPort (eDP), DisplayPort, and DisplayPort over USB-C). Each user has their own screen, audio(in/out), and input (keyboard, mouse, touchscreen, etc). The overall concept is to create a low cost, resource sharing system that is efficient in its operation. The invention is relevant for low-to-medium end capability use cases.

Figure 1:
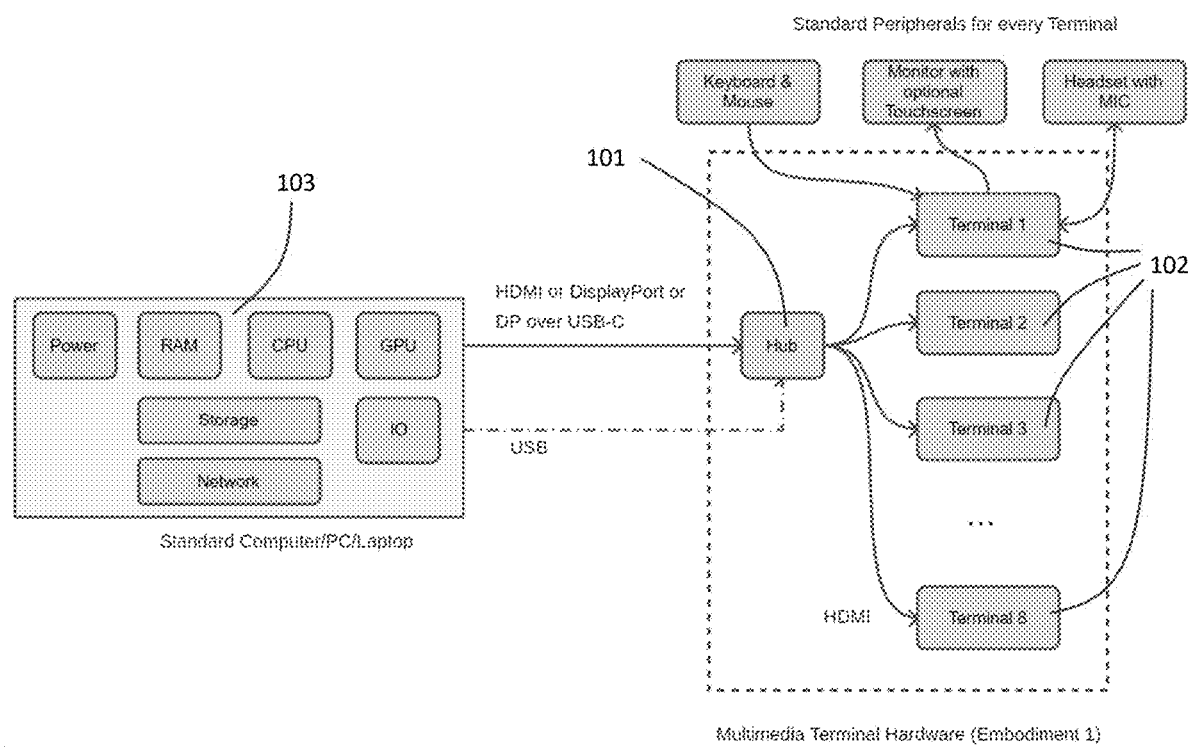
FIG. 1 is a schematic of the Multimedia Terminal for multiple users with keyboard, video, mouse, and host computer.

The hardware blocks implementing the concepts of this invention are inside the dotted line in FIG. 1.

The hub (101) and terminal (102) are hardware components specific to the multimedia terminal system. FIG. 1 only shows a single hub (101) connected to a computer (103). Given a sufficiently capable system, it is possible to connect more than one hub to a computer system to increase the user density.

Figure 2:
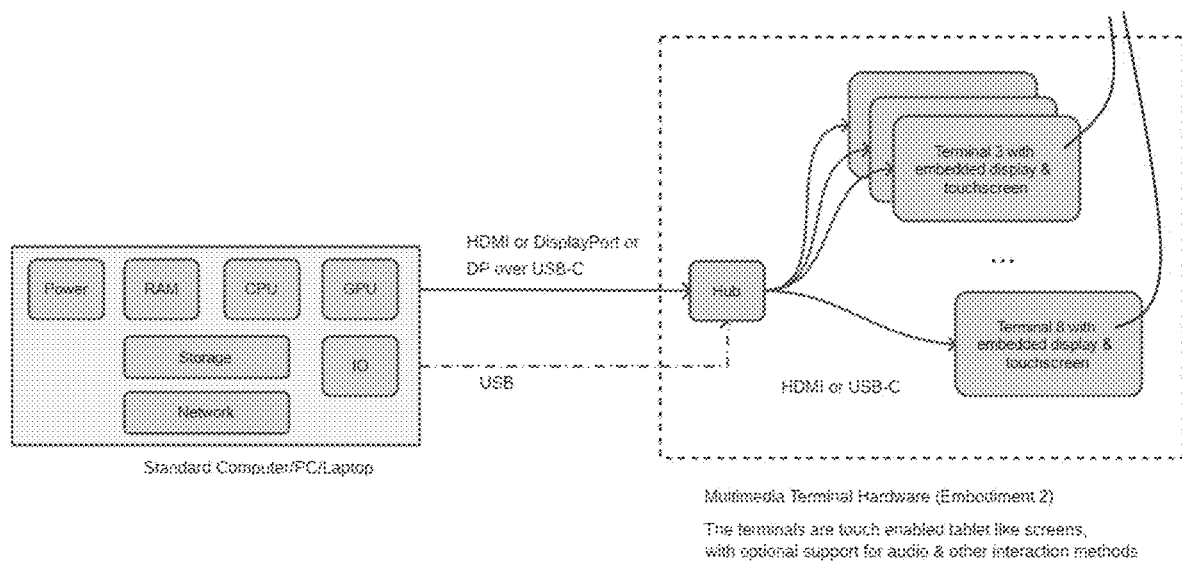
FIG. 2 is a schematic of a tablet user experience version of the multimedia terminal for multiple users.

With the proliferation of mobile devices in the past decade, touch-based interaction paradigms have become very popular. It is possible to embed the display into the terminal component (201) to allow the users to use this familiar interaction method, as shown in FIG. 2. Embedded interaction devices include but are not limited to tablets (with or without touchscreens, buttons, switches, volume controls), keyboards, mice, sensors (e.g. accelerometers), biometric devices (e.g. fingerprint scan).

Figure 3:
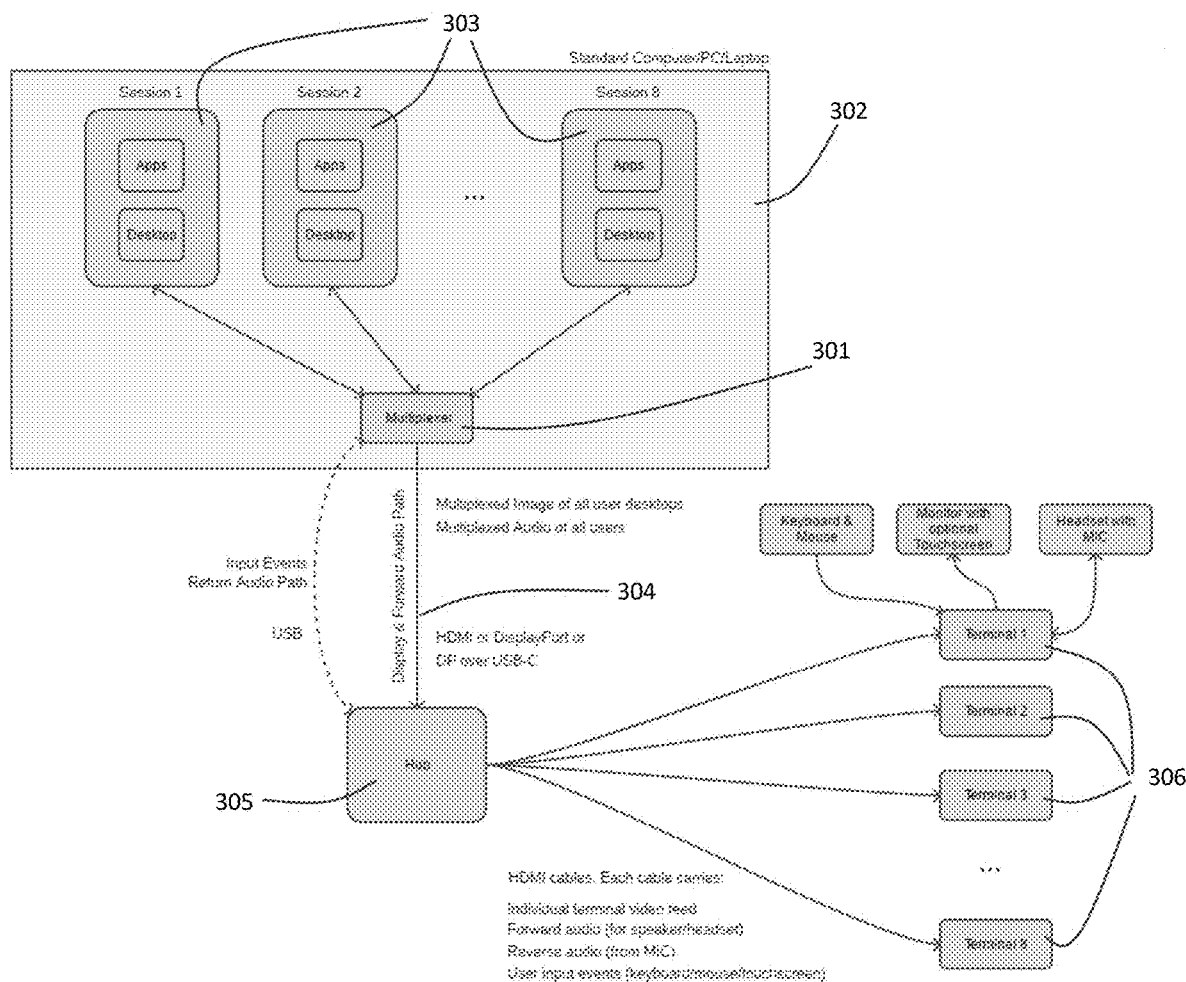
FIG. 3 is a schematic of the data flow in the multimedia terminal system.

The hardware blocks work in tandem with a multiplexer software component (301) running on the host computer (302), as shown in FIG. 3. Here, the term "display" can refer to video, audio, or both.

On the host computer, the multiplexer program (301) manages the interactive sessions of multiple users (303). It works as layer above the "display server" for these users. A display server in the context of this disclosure is a component that provides a display to a windowing system, a Virtual Machine (VM) or to a container. A display server may reside at a hypervisor level or could also reside in a trust zone in an ARM system. The display server may also directly manage applications, including interactivity. The multiplexer packs the display data of multiple display servers into a single logical image that is streamed over the wire (HDMI/DisplayPort) (304). The overall maximum capacity of this stream is limited to the capabilities of the GPU. Graphics cards have limitations in terms of the maximum resolution of the display they can drive. To drive more screens with lower refresh rate, we can drive the GPU at a higher refresh rate. This could be done on an "alternate frame" basis. To achieve this, pixels are spread across two or more frames. The reference 8k/60 Hz is equal to 4×4k@60 Hz. If the output frame rate is 30 Hz, then we can drive 8×4k@30 Hz. Similarly, there are many GPUs that can do 4k@120 Hz which is enough to drive 16×1080p@30 Hz. 30 Hz is sufficient for a digital signage or video wall application.

By multiplexing multiple user images, we can use this capacity to support multiple users. As the number of users increases, the resolution available to each individual is reduced proportionally. E.g., given a HDMI interface that supports 4K/60 Hz, nine users can be supported if a 720p resolution screen is required for each terminal, seven users can be supported if 1366×768 resolution is required, and four users can be supported at a resolution of 1080p. With a HDMI interface supporting 5K/60 Hz, 15 720p screens can be supported, 13 screens of 1366×768, and six 1080p screens can be supported respectively.

The multiplexer may be implemented at a number of levels within the software stack including but not limited to the application level, middleware, the operating system, a hypervisor, or a "trusted execution environment". Furthermore, the application and the multiplexer could be integrated into a single component where the multiplexer becomes a "library" accessible to the computing platform.

The multiplexer also packs the audio for the users on the same wire. The overall bandwidth available for audio can carry audio data for multiple users. Considering HDMI support for 24 bit 8 channels at 192 kHz, audio for 24 users can be packed into the same bandwidth. USB is also a possible forward audio path. FIG. 4 shows an encoding scheme for supporting eight terminals, with a stereo (left/right) audio for each at the rate of 48 kHz, with 16 bits (2 bytes) per sample. The actual audio stream runs at 96 kHz, i.e. twice the rate of the user audio. Alternate samples in time are used to transfer audio for terminals identified in the figure. The first byte of channel 0 is used as an identifier byte (401). Looking at this byte, the audio decoder in the hub can separate the audio samples for each terminal. The top two (most significant bits) of the identifier represent a sequence number. The lower six bits represent the total number of terminals minus 1. In FIG. 4, the sequence byte 0×07 (402) would mean "sequence #0 with 8 terminals". Similarly, 0×47 (403) would mean "sequence #1 with 8 terminals". The number of terminals need not necessarily be encoded in the identifier. It can be communicated over USB to the hub. Individual users using the terminals may start and stop audio at any time. This does not change the sequence number. A mute/unmute command is sent over USB to the hub to convey this information. When an audio stream for a terminal is muted, then the audio sample values for that terminal are set to zero.

Note that a sequence number is not always necessary. When the total number of bytes for all terminals can fit into the total number of bytes available for all channels, the sequence byte will always be the same, so there is no need to send it. FIG. 5 is an extension of the example from FIG. 4, with the multiplexed audio stream having 32 bits (4 bytes) per channel, increased from 24 bits (3 bytes) per channel. The data flowing to the terminal remains the same. It is possible to fit the data for one time sample in one sample of the 8 channel audio. So the data rate of the output audio is the same as the input rate, i.e. 48 kHz. If sufficient audio bandwidth is not available over the display interface, then audio may be streamed over USB, with the hub supporting either a USB Audio Compliant interface or custom designed USB isochronous stream endpoints.

The packed image generated by the multiplexer (301) is streamed to and received by the hub hardware component (305). The hub de-multiplexes the packed image stream. The packing scheme employed by the multiplexer for the images (i.e. desktop) of the user sessions is designed to allow for simple, fast "on-the-fly" demultiplexing on the hub using minimal hardware resources. Unpacking the incoming image stream yields the individual desktop image streams. These are sent to the individual terminal hardware components (306). Further, the hub sends combined audio and interactivity input to the multiplexer and the multiplexer reverses the process to deliver the data back to the individual user sessions.

Figure 6:
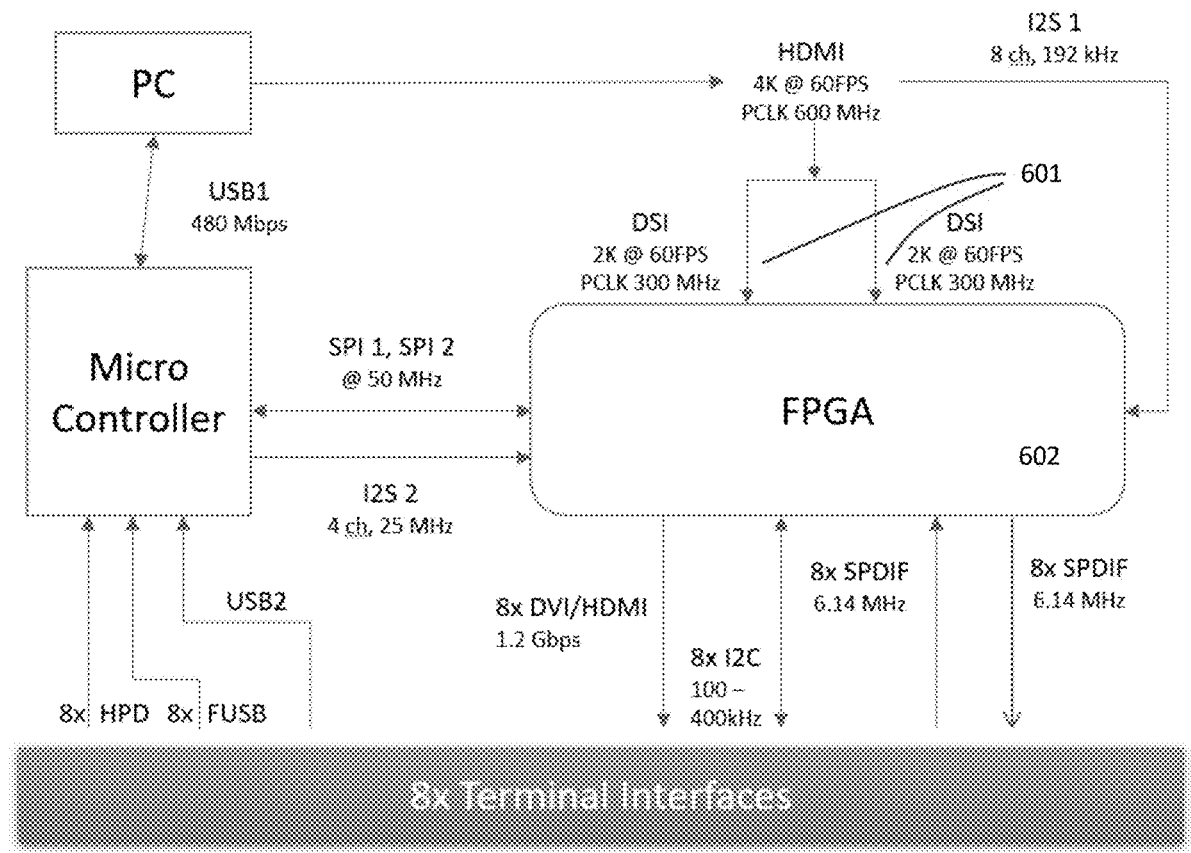
FIG. 6 shows a sample implementation architecture for the hub (host computer is included for reference).

The packing scheme for pixels typically follows the implementation specifics of the hub. One embodiment is shown in FIG. 6. Here, the incoming image is split into two vertical half images: left and right (601). The two halves are then processed on the FPGA (Field Programmable Gate Array) (602). As the FPGA effectively receives two independent data streams, it is advantageous to pre-assign half the terminals to the left half of the image, and half the terminals to the right half of the image.

The least cost hardware implementation with the FPGA (dedicated integrated circuit) should require only a small FIFO and no additional memory. FPGA is a programmable hardware component. Once a specification is implemented in hardware, its programmability is removed, but the FIFO remains. Considering this, the packing interleaves the pixels on the left and right halves in specific ways. There are broadly four methods that are described in the next section.

Display Packing Methods

Display interfaces (DVI, HDMI, DisplayPort, DisplayPort over USB-C and DisplayPort over Thunderbolt) are primarily designed for the purpose of interfacing external display devices to GPUs. Display devices generally concern themselves with maintaining a stable image of a designed quality with attributes suitable for specific applications/application areas. Standards allow independent development of the GPU and display devices while ensuring interoperability, performance, and ease of implementation at the same time. Typically, a user takes a HDMI display device (monitor, projector, etc.), connects it to the HDMI output of a system, and expects the display to display an image. For this to work, displays expose an EDID (Extended Device Identification Data). Looking at this, the GPU knows what resolutions, refresh rates, and timing parameters are supported and recommended by the display device. The GPU then matches this to its capabilities and drives the display using an appropriate signal.

A similar role is played by display interfaces in an embedded system (e.g., a smartphone). MIPI DSI is one such interface. In an embedded system, the display is physically combined into the system. There is no need to "discover" what display device is connected. Taking advantage of this, the implementers of such devices "bake-in" the right parameters for the displays. However, increasingly, even such systems are developing capabilities of driving one or more external displays. eDP (Embedded DisplayPort) is intended for use in an integrated system (e.g., laptop) and offers the discoverability of external interfaces.

Typically, the graphics output to the display is the highest speed external interface available in any computing system. The terminal system proposed in the present invention tries to maximize the utilization of this fast data path to serve many users in a scalable manner.

To make a single computing system serve the needs of multiple users, we add additional components to the system—the multiplexer, the hub and the terminal. The multiplexer combines the image for multiple terminals into a single logical image. It then uses the GPU to drive this combined image to the hub. The hub looks like a display device to the GPU. The hub demultiplexes the input images into the images for the individual terminals. Using these images, it drives display signals for each terminal. Display signals are continuous on both the input and output side. To ensure no drop in frames, the hub locks the refresh rate of the output to the input. Note that the data rate of the output side is lower than the input rate. However, the frame rate is the same.

Figure 7:
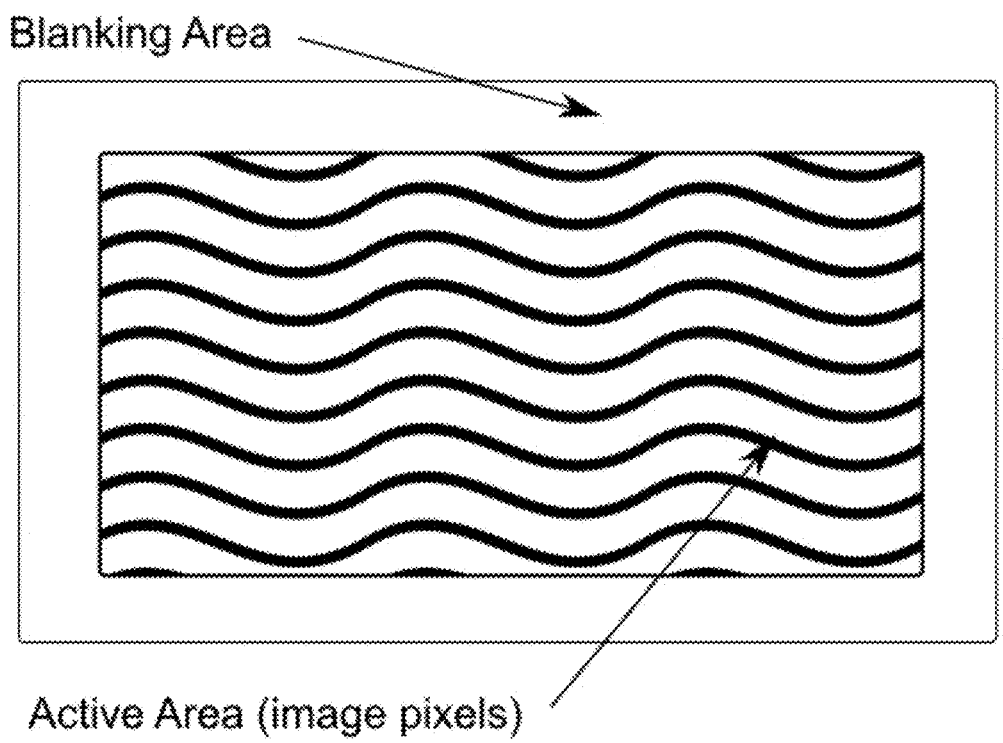
FIG. 7 the two areas generated by the GPU; the active area and the blanking area.

A typical display signal generated by a GPU consists of two areas, as illustrated in FIG. 7.

1 Active area—where the pixels are being transmitted
2 Blanking area—where display synchronization signals (VSYNC, HSYNC), audio data or other auxiliary data is transmitted The GPU directly creates active and blanking areas suitable for the displays connected to it. In the present invention, the display output of the GPU is used as a high-speed data path to carry pixels (and audio). The generation of the actual display signals for the terminals is done by the hub. It is important to understand that the time required to transmit the active area of the terminals may be different from the time required by the GPU to transmit the active area of frame.

Display standards are a tricky area that encompasses many implementations, having subtle differences and incompatibilities. Varying feature sets exposed by separate standards makes it difficult to implement a uniform solution. Therefore, the present invention uses only the simplest, base features guaranteed to be available in any implementation— that is basically a continuous transmission of 2D images (called "frames") at 1 a constant refresh rate (commonly 60 Hz, 120 Hz)
2 with a set resolution—e.g., 3840×2160 pixels ("4K")
3 at a specific bit depth (e.g., 24 bit RGB with 8 bits per component, 36 bit RGB with 12 bits per component)

If the refresh rate of a display is 60 Hz, then the time to transmit one frame is 1/60 seconds=16.67 milliseconds. Due to the blanking time, the total time to transmit the active area is less than 1/60 sec.

Figure 8:
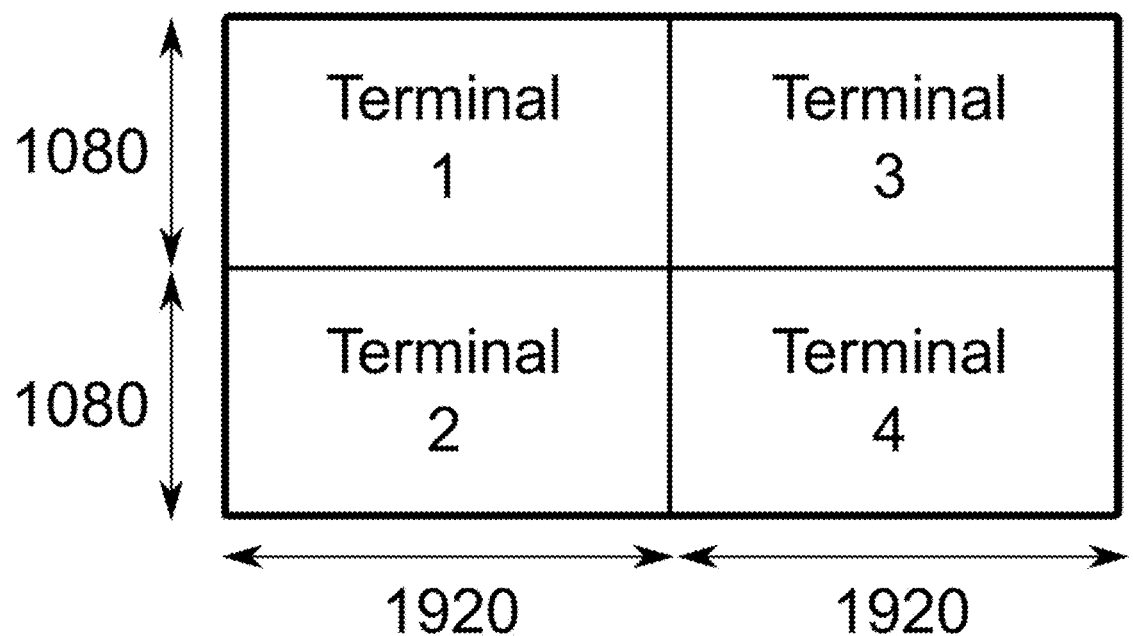
FIG. 8 shows a display area divided into four equal terminals of 1920×1080 resolution, a "tiling" approach

There are many ways to implement the hub in this scheme. The simplest way would involve display "tiling" (see FIG. 8). To make this work, the hub requires adequate high-speed memory. Typically, two full frames at maximum resolution would be required. One frame of memory would be used to store the incoming frame. One frame of memory—corresponding to the previous frame—would be used to drive the displays. Interfacing with high-speed memory increases the complexity and hence typically the cost of the solution as well. This would introduce a latency of 1 frame between the input and the output—which is quite significant for interactive applications. That said, this solution would work reasonably well for video wall applications. Our implementation does not prefer this scheme—it is quite possible that commonly available video wall controllers use a similar implementation scheme.

When implementing hardware, it is advantageous to ensure a low-cost implementation. There are two aspects to this:

1 Reducing the memory requirement on the hub is required to reduce the implementation complexity and hence the cost. A least memory architecture reduces buffering, and hence the latency. Minimum added latency is a requirement for interactive applications.
2 Display devices such as monitors support standardized timing (VESA has standards for monitor timings; this ensures broad compatibility). If the primary requirement is to drive multiple displays of the same resolution (typically very similar timings), then only one timing generator is required. If mixed resolution support is required, extra timing generators need to be added.

The packing schemes are designed to enable a low-cost implementation of the hub, making it low latency and hence suitable for both interactive and video applications.

The pixel packing operation is offloaded to the multiplexer that runs on the host computer. Modern GPUs are typically equipped with fast memory—much faster than user system memory. When possible, the "display servers" are typically setup to render the content of the user terminals into GPU memory. The multiplexing of the images is done by the GPU in its local memory—so this happens very fast. The CPU is much slower at these operations than the GPU. Implementation on the GPU ensures that the multiplexer has the least impact on system performance. This is an important consideration when many users share the system.

Depending on the implementation of the hub, the pixel packing scheme first partitions the frame into one or more vertical strips. Each vertical strip can be processed in parallel by the hub. This reduces the data rate of the individual streams processed by the hub—reducing the complexity of the hub. The frame can be divided into two or more vertical strips. If we consider partitioning into two vertical strips, then left half and right half strips both pack images for multiple terminals.

Inside these vertical strips, it is possible to use one of several methods to pack the pixels.

Figure 10:
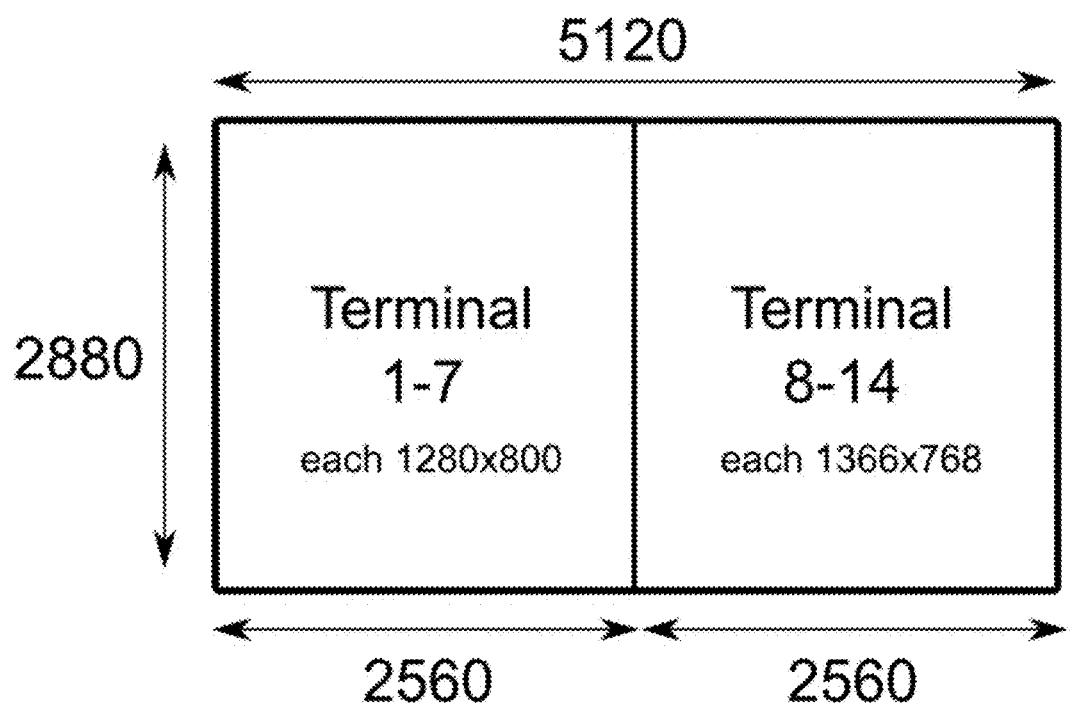
FIG. 10 shows eight terminals, each of 1280×800 resolution, are fit into a 4K (3840×2160) resolution frame.

FIG. 10 shows how eight terminals, each of 1280×800 resolution, are fit into a 4K (3840×2160) resolution frame. The left strip of 4K has 1920×2160=4147200 pixels. Each 1280×800 terminal=1024000 pixels. Therefore, the left half can fit 4147200/1024000=4 terminals. Similarly, the right strip can also fit in four terminals.

Figure 11:
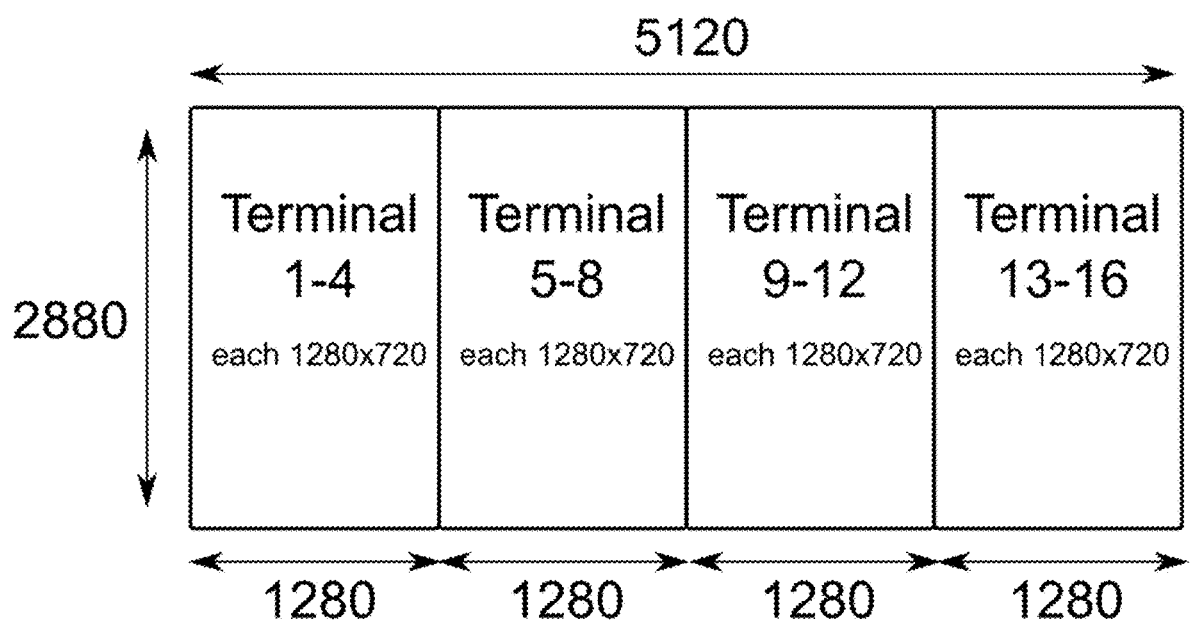
FIG. 11 shows how a 5K image can serve fourteen terminals—7 of resolution 1280×800 and 7 of resolution 1366×768.

Dividing the image output vertically can also provide a simple method to drive mixed resolutions. If two different resolutions are required, then the left half of the image could be used for a set of terminals with one resolution, and the right half could be used for terminals with a separate resolution. FIG. 11 shows how a 5K image can serve fourteen terminals—7 of resolution 1280×800 and 7 of resolution 1366×768.

As FIG. 11 shows, with pixel packing, the output terminal resolution does not need to be a multiple of the input resolution. This enables effective utilization of the available pixel bandwidth to transmit images of multiple terminals.

Figure 12:
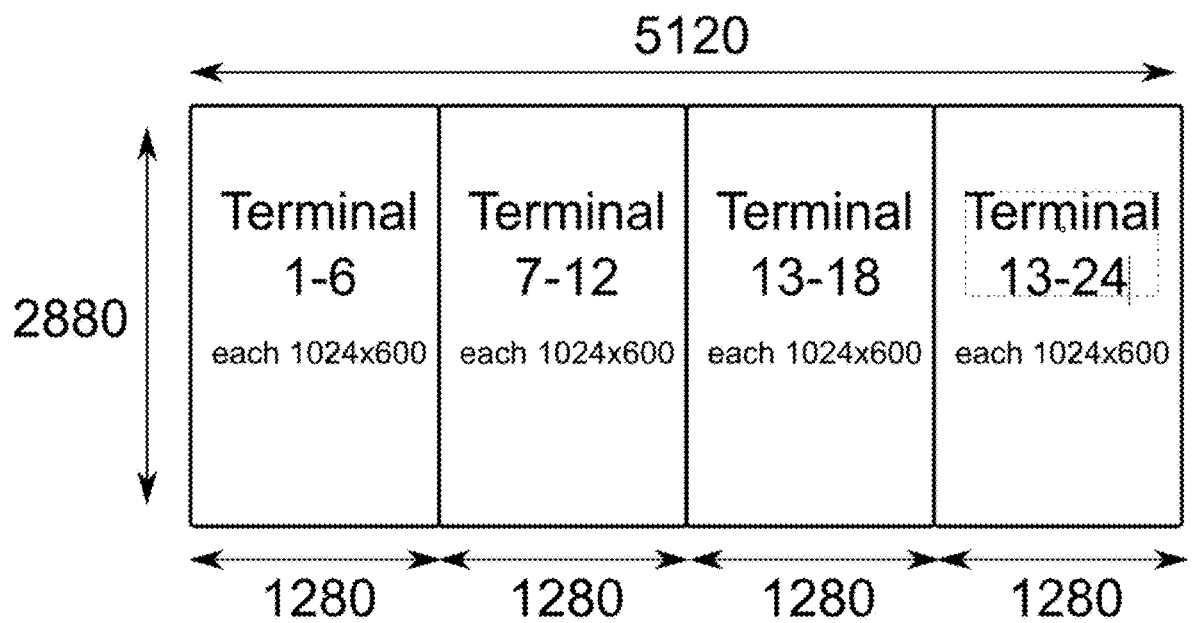
FIG. 12 shows a four-way vertical split with a 5K frame used to drive 16 terminals.

A four-way vertical split is shown in FIG. 12 with a 5K frame being used to drive 16 terminals. In this case, the horizontal and the vertical resolution of the terminals (1280, 720) exactly divide the horizontal and vertical dimensions of the vertical strips (1280, 2880).

Figure 13:
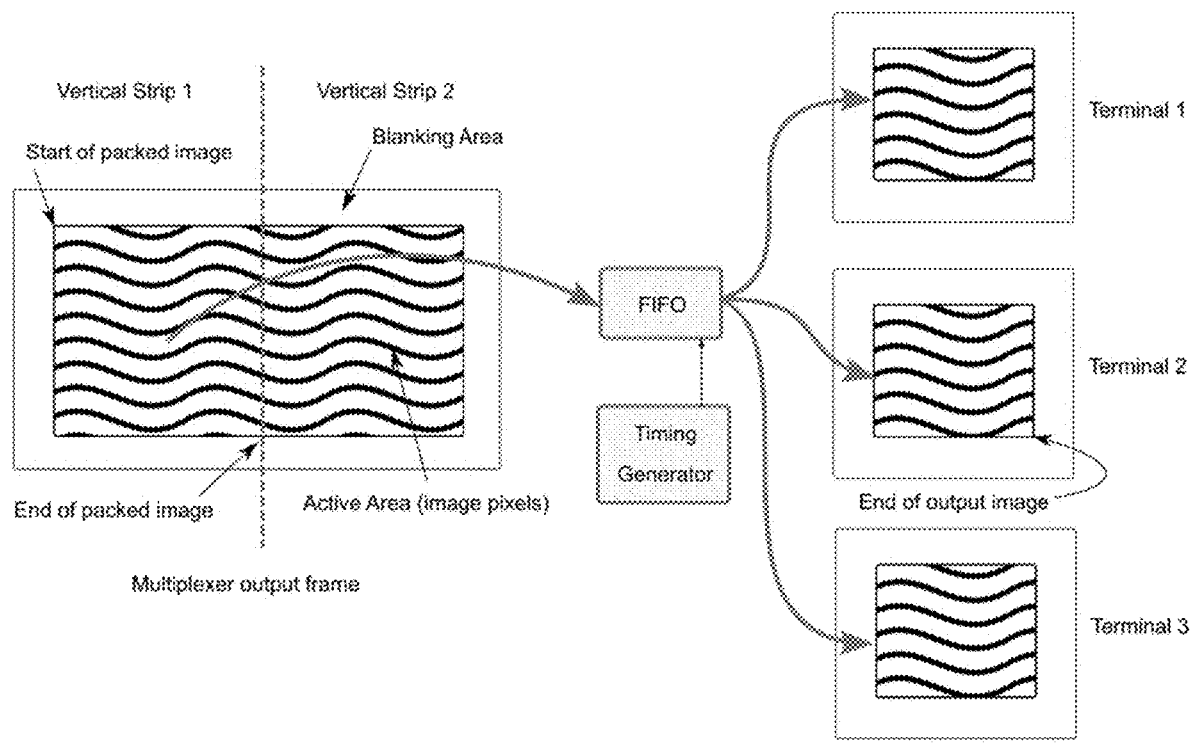
FIG. 13 shows twenty-four terminals packed in a 5K frame.

As a final example, FIG. 13 shows twenty-four terminals packed in a 5K frame.

The Pixel Packing Schemes

FIG. 14 shows how a hub handles an incoming frame. Pixels of each of the vertical strips go into a separate FIFO. The timing generator generates the timing for the display signals of the terminals. Pixels are pulled out of the FIFO at a rate governed by the timing generator and used to drive the display signal for the terminals. The process of populating the FIFO starts at the top left of the active area of the vertical strip. The "end of output image" cannot happen before the "end of packed image". The focus of the packing schemes is to keep the size of the FIFO (and hence memory) required to a minimum.

The packing schemes use a round robin method, packing pixels of the terminals assigned to a vertical strip in a fixed order. This is reversed in the hub to get back the pixels for the individual terminals.

Method 1: Packed by Row: In this method, rows of pixels of consecutive terminals are packed into consecutive rows of the vertical strip in a round robin fashion. FIG. 15 shows an example for three terminals. This packing method is most useful when the width of the vertical strip is the same as the width of the terminal. When this is the case, each row of the vertical strip is fully used up to store one row of pixels from one source terminal.

In some cases (depending on GPU capabilities), it is possible to alter the resolution and timing of the displayed image. Simple interleaving can be used in these cases. As a non-limiting example, consider six terminals of 1366×768. This can be organized into two vertical strips of 1366×2304 pixels side by side. Each vertical strip contains pixels for three displays. The overall resolution becomes 2732×2304 pixels. The individual vertical strip can be interleaved in a round robin fashion by row (see FIG. 16). One benefit of this method is that the timing (called "pixel clock") for the terminal screens may be derived by dividing the input timing by an integer divider.

Method 2: Packed by Row, with or without Padding: This method generalizes on method 1. The vertical strip is treated as a buffer that is packed pixel-by-pixel from left to right. When the end of a row is reached, packing resumes from the first pixel of the next row.

Rows of pixels of consecutive terminals are packed into pixels of the vertical strip in a round robin fashion. Sometimes, this process is not effective. E.g., consider a strip of size 1920×2160 (one half of 4K). If the terminal resolution is 1366×768, then three terminals can pack into this strip without padding. However, once this is done, 1920*2160−(1366*768*3)=1 million (approx.) pixels will be unused. This will require a rather large FIFO to make ensure that the incoming pixels are stored till the end of the frame.

To solve this problem, we introduce the provision of one or more padding pixels at the end of each row. For simplicity of implementation, a uniform padding value is used for all rows. The padding pixels are ignored by the hub. They are used to match the rate of the incoming data (active pixels) to the rate of the outgoing data (pixels for terminals). Padding is useful when many pixels in a vertical strip remain unused. In the above example, if a padding value of 430 can be used. Doing so will reduce the effective incoming data rate, enough to ensure that the output rate is close to the input rate without causing a FIFO underflow.

As further detail, in this method, a standard image resolution is used. This is good for compatibility across a wide variety of hardware and system software. E.g. the commonly used 4K resolution is 3840×2160 pixels. As the image gets split into two halves, each half will have 1920×2160 pixels. That is a total of 41,47,200 pixels. For three terminals assigned to each half, the number of actual pixels required is 3×1366×768=31,47,264 pixels. The display image has more pixels than required. The unused pixels can be used as padding. Each row of incoming pixels can be padded to 1800 pixels (19200*2160/768*3), with 1366 pixels corresponding to the terminal image and the rest set to zero. As the number of pixels in half row of the image is 1920, each row may store (a) one full row of pixels corresponding to a terminal, and one partial row of pixels corresponding to the next terminal OR (b) two partial rows of pixels corresponding to two terminals.

When this method is used, the data rate for the outgoing video will dictate the size of the padding. For this example, using a padding of 1796 pixels is the recommended value to ensure that the outgoing data rate from the FIFO never exceeds the incoming data rate.

Method 3: Consecutive pixel of each Row, with or without Padding: This method implements a round robin with a small number of consecutive pixels of each terminal—typically 2 or 4 pixels (called a "set" of pixels). Consecutive pixels are considered from in a left to right fashion from the top left of a terminal. If the end of a row is reached, the next set is considered from the beginning of the next row of pixels.

Like method 2, the vertical strip is treated as a buffer that is packed pixel-by-pixel from left to right. When the end of a row is reached, packing resumes from the first pixel of the next row.

The first set of pixels from terminal 1 are packed into the vertical strip, followed by the first set of pixels from terminal 2, then the first set of pixels from terminal 3, followed by second set of pixels from terminal 2, and so on. Again, padding may be used for matching the data rates.

Figure 17:
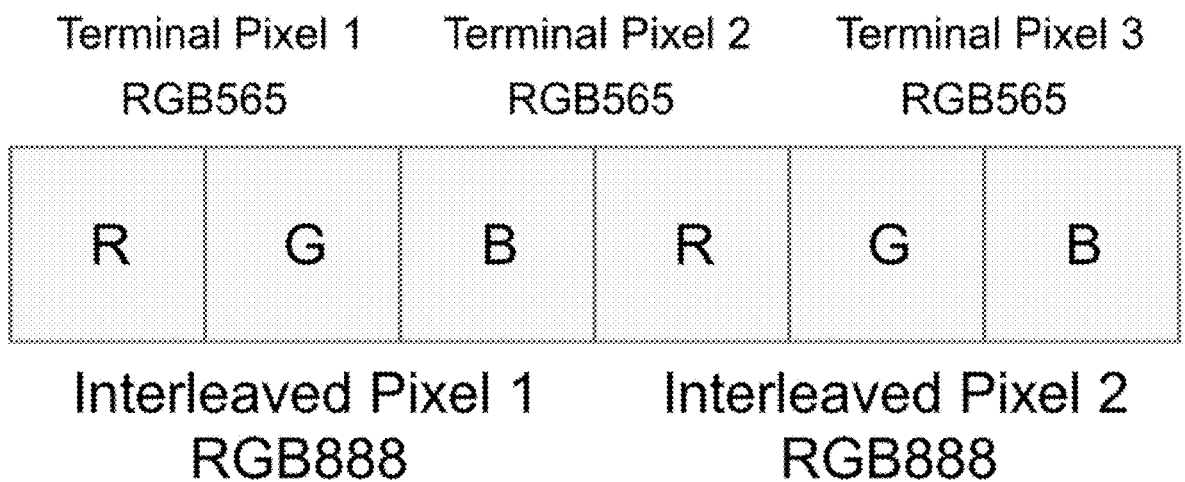
FIG. 17 shows the interleaving scheme for method 3 for 6 displays, left half, for interleaving pixel packing.

As further detail, In this case, one or more consecutive pixels of terminals are interleaved in the rows. Three rows of incoming pixels will be padded in 1800*3=5400 pixels. This scheme is shown in FIG. 17. A different value, e.g. 1796*3=5388 pixels could be used for FIFO optimization.

Method 4: Frame Rate Reduction: In this method, the output frame rate is an integer fraction of the input frame rate. E.g., if the input frame rate is 60 Hz, then output can be 30 Hz. If the refresh rate is halved, then the number of output terminals can be doubled.

Frame rate reduction works by spreading the pixel packing over two or more frames. The same vertical strip across frames is used for the pixel packing for a set of terminals. This is a "meta" packing method in the sense that it can use any of the methods 1, 2, or 3.

For this scheme to work, the hub needs to know when a packing sequence starts. This can be conveyed by the hub to the multiplexer before the VSYNC of the first frame in a sequence. After the initial synchronization, the multiplexer and the hub work in lockstep every frame. So, it is not required to send the synchronization signal more than once. When this packing method is used, the hub will not drive the output displays till the synchronization signal is received. After that, a continuous sequence of frames is received and used to drive the output displays.

As further detail, Methods 1, 2, and 3 pack the contents of N terminals into the wire. The refresh rate of all the terminals is therefore the same. It is possible to decouple the refresh rates of the terminals. The output frame rate can be reduced and more terminals can be driven with the same capacity. If the input frame rate is 60 Hz, and the output frame rate required is 30 Hz, then a variation of method 1 can be used to pack the contents of twice the number of terminals (N*2). In even numbered video frames, the top half of the image of (N*2) terminals is transmitted. In odd numbered video frames, the bottom half of the image of (N*2) terminals is transmitted. Displays generally have no notion of "odd" or "even" frames. To create this notion, the multiplexer can send a command to the hub over USB indicting that the next frame is an "even" frame. This command can be sent in advance of the VSYNC (Vertical Blanking) signal. After this initial synchronization, the multiplexer and the hub can work in lockstep. If N*2 terminals are not required, then the content for the unneeded terminals can be left blank, and the multiplexer can convey information about the active terminals to the hub using commands sent over USB. Pixel packing methods 2 and 3 can be similarly extended to support frame rate reduction. Note that this method is generic with respect to frame rate reduction. Frame rate reduction can be an integer number—e.g. 60 Hz to 30 Hz, 120 Hz to 30 Hz, 144 Hz to 72 Hz, 72 Hz to 24 Hz, 240 Hz to 120 Hz, 360 Hz to 90 Hz, etc. The lower output refresh rates (24, 30 Hz) would typically correspond to video applications, 50, 60, 72 Hz would correspond to interactivity and/or mixed video, and 72 Hz, 90 Hz, 120 Hz and above would cater to high refresh rates such as VR.

Displays require a continuous signal. Spreading the pixels over multiple frames as required reduces the memory requirement on the hub. However, compared to the single frame packing methods 1,2, and 3, this method needs a larger FIFO (and hence memory) to cover the vertical blanking timing of the displays.

Figure 9:
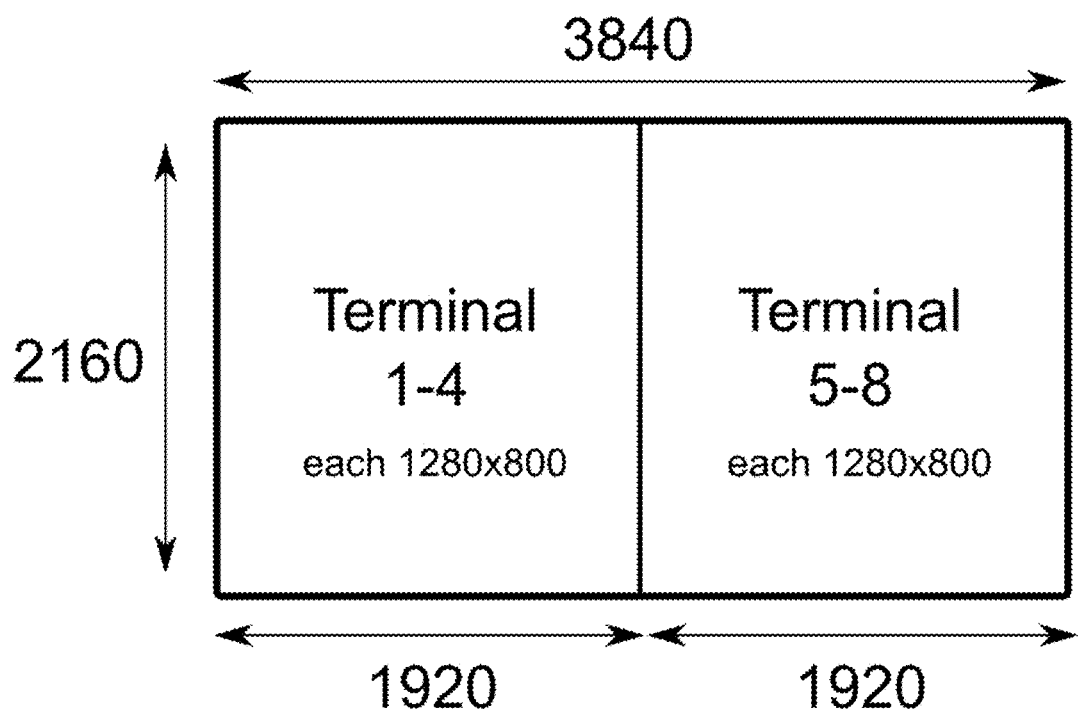
FIG. 9 shows packing of terminal pixels of lower bit depth (16 bit, RGB565) into pixels of a higher the bit depth (RGB888) in the image sent by the GPU.

Pixel packing methods 1-3 do not require a 1:1 correspondence between bit depth of the pixels generated by the display server and the pixels in the interleaved image. If the bit depth of the interleaved image is higher than the bit depth of the pixels generated by the display server, then additional pixels can be packed. As an example, the display servers could generate 16 bit images (RGB565) —while the interleaved image may be 24 bit (RGB24). In this case, two pixels in the interleaved image (48 bits total) can store three pixels of the terminal image (16 bits each). This is illustrated in FIG. 9. Mainstream GPUs now support beyond 24-bit color—support for HDR (high dynamic range) formats such as 10/12 bit per component is available. With 12 bits per component, two pixels in the interleaved image (2*12*3=72 bits) can store three pixels of 24-bit RGB images as shown in FIG. 9.

GPUs may have limitations on the maximum resolution that can be output by them. Three incoming pixels packed in two outgoing pixels translates to a 50% increase in the number of terminals at a given resolution.

The terminal component sends the video stream to the monitor/display device. The audio stream is sent to the audio sink (headset/speaker). Assuming a HDMI connector, the reverse audio stream (MIC) is sent back to the hub over the HDMI ARC channel as a SPDIF data stream. Input events (keyboard/mouse/touchscreen/any other option buttons etc.) are passed to the hub using the DDC channel of the HDMI interface (connector). This usage of the DDC channel for transmitting input events is outside of the HDMI specification. The CEC pin of the HDMI connector may be used as a forward audio path as well. This usage of the CEC channel for transmitting audio is outside the HDMI specification. The CEC and ARC may be used both as forward and reverse channels.

The hub takes the input events, reverse audio and returns them back over the USB cable to the multiplexer. A separate USB cable is not required if USB-C is used, as it is capable of carrying the video content and USB simultaneously. The multiplexer routes the input events to the display server for the individual users. The reverse audio is also similarly provided to the appropriate software services. The multiplexer assigns a unique ID to each terminal, and associates this with the display server & associated audio services.

Figure 18:
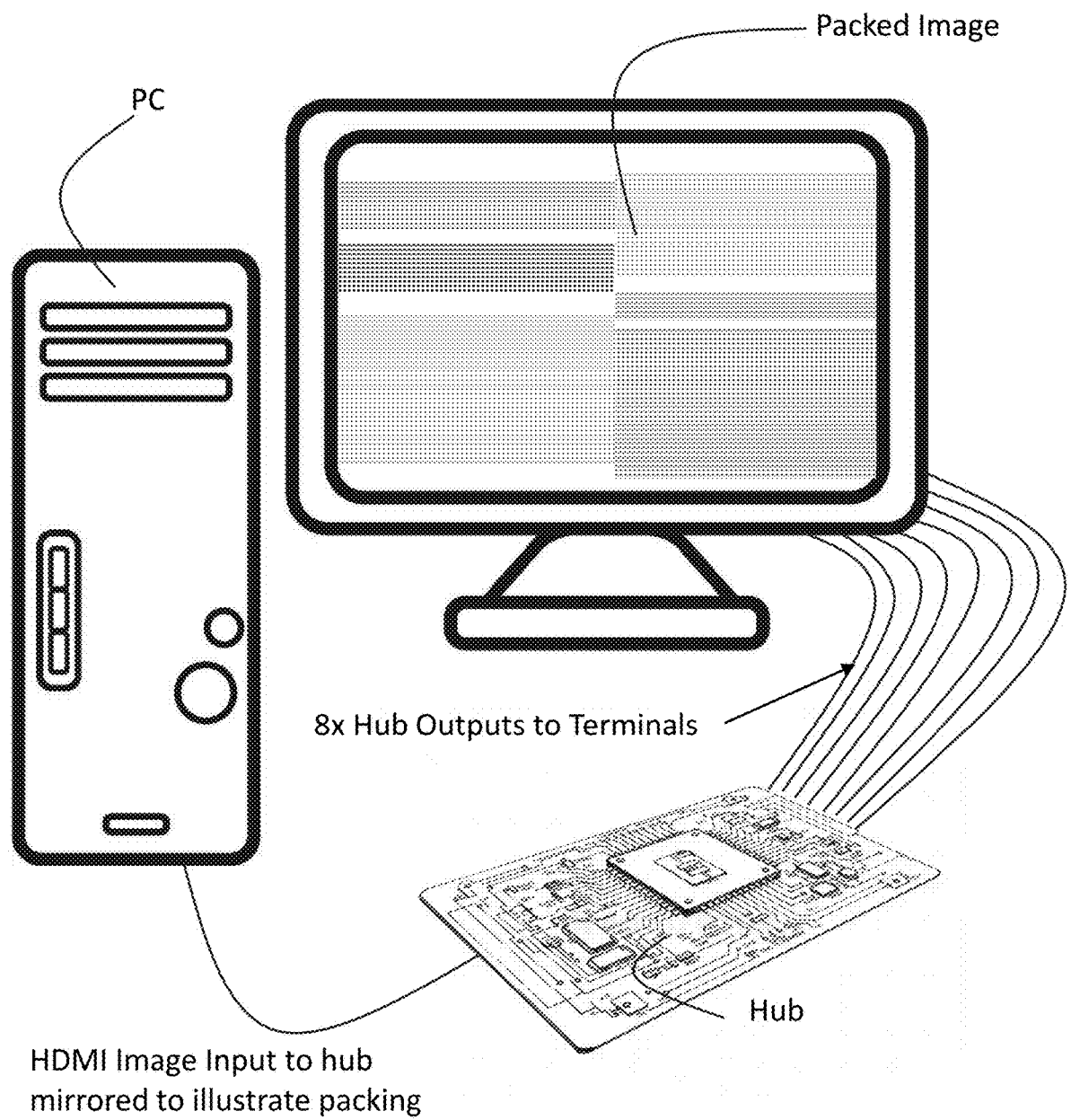
FIG. 18 shows the prototype implementation with hub, host computer, and a packed image, included here to demonstrate enablement.

FIG. 18 shows the prototype hub connected to a PC with the packed image mirrored on the HDMI monitor for test and illustration purposes and to demonstrate enablement.

It should be noted that the many wires connecting the multiplexer and the hub could be alleviated with existing wireless technologies. For example, the new wireless HDMI standard, and also video streaming on higher frequencies (e.g. WiGig (60 GHz)) can perform much better, with support for 4K resolution, and likely more in the near future.

DESCRIPTION OF EMBODIMENTS

The invention was primarily conceived for education use cases where video is a primary part of the content and the applications do not otherwise have any high-performance requirement from the system. As the system is generic in nature, it is useful for non-educational applications such as kiosks, information centers, etc. In all these cases, there is a standard computer. The users sit in physical proximity to the computer, sharing its resources. Each user has their own terminal. A single PC can drive 32 terminals, suitable for a single digital lab/classroom.

The invention has further applications in signage, interactive digital signage, and art installations. In the case of pure signage, it provides the ability to drive multiple displays. In this case, the multiplexer manages the display of a single application spread over all the displays. The hub generates signals for all monitors in sync. So the display on all monitors will be in perfect sync. Typically, achieving such synchronization requires specific hardware solutions which can add to the cost or complexity of the deployment. The present invention does not need add-ons for achieving sync, which is an advantage.

Interactive digital signage and art installations could consist of multiple displays distributed physically in other ways. E.g. a booth in an exhibition center where a company is displaying products. A terminal (see FIG. 2) can be placed near each product. Visitors to the booth can then see detailed information, video, etc. related to the product. They can also seek contact details, further information using the interactive touchscreen. The system is fast and easy to setup as there is only one PC which holds a single application and all the data. There are no security issues as no (WiFi) network needs to be setup to share data among the terminals. It is enough for the single PC to have internet access to get any updated content, upload information to the cloud, etc.

Further embodiments include interactive video walls and CAVE (Cave Automatic Virtual Environments) implementations. The present invention could be configured to create an interactive video wall where any portion of the wall could be independently controlled possibly with its own interaction devices. A CAVE could be configured to allow multiple users to interact with the environment simultaneously and could be configured to adjust the viewer frustum for multiple simultaneous users, albeit not on the same display surfaces at the same time.

INDUSTRIAL APPLICATION

The present invention applies to educational and industrial applications where multiple simultaneous users need to share the same computing platform. K-12, higher ed, and industrial training applications are included as well as interactive advertising and signage, video walls and CAVEs.

What is claimed is:

1. A multimedia terminal system for hosting multiple simultaneous user sessions each on a terminal from a single host computer, wherein an entire user session input stream including video, audio, and interactivity, is associated with a corresponding user display, the system comprising:

the host computer having a power source, non-volatile memory storage, a microprocessor, a graphical processing unit, input connectors, and at least one output display interface;

at least one application executing on the microprocessor of the host computer;

at least one terminal coupled to at least one hub, wherein each terminal is coupled to at least one display device; and a multiplexer coupled to the host computer, said multiplexer having a display manager that packs display data from an image for the at least one terminal into a single logical image, and wherein the microprocessor contains instructions for:

partitioning the image into at least one vertical strip;

calculating a number of displays for the at least one terminal that can fit within each vertical strip;

creating a display block associated with each individual terminal;

multiplexing the display blocks for each vertical strip via a round robin ordering by row, producing interleaved display blocks;

transmitting the vertical strips having interleaved display blocks to the at least one hub having an integrated circuit;

demultiplexing the vertical strips into individual display blocks at the at least one hub;

generating a timing for display signals for the individual terminals, wherein pixels are pulled out of the integrated circuit at a rate governed by the timing and used to drive a display signal for each of the individual terminals; and transmitting the display signal for each of the individual terminals to the individual terminal for display.

2. The system of claim 1 wherein the multiplexer is implemented within a software stack at one of an application, a middleware, an operating system, a hypervisor, and a trusted execution environment.

3. The system of claim 1 wherein the terminal is further coupled to at least one input device.

4. The system of claim 3 wherein the input device uses one of the DDC/AUX channel on HDMI and DisplayPort and the CEC pin on the HDMI connector on the terminal.

5. The system of claim 1 wherein the output display interface of the host computer is one of HDMI, DVI, DisplayPort, embedded DisplayPort, DisplayPort over USB-C, ThunderBolt, and MIPI DSI, and wherein the multiplexer and the hub are connected via at least one wireless protocol including wireless HDMI and WiGig.

6. The system of claim 1 wherein at least one terminal includes an embedded display.

7. The system of claim 1 wherein at least one terminal includes an embedded interaction device.

8. The system of claim 1 where the multiplexer is contained in a separate hardware module and is coupled to the host computer and to the at least one hub.

9. The system of claim 1 wherein the multiplexer is implemented via at least one of inside the GPU hardware and inside the driver of said GPU, coupled to the host computer and to the at least one hub.

10. The system of claim 1 wherein the multiplexer packs audio for the multiple simultaneous user sessions into a single logical stream.

11. The system of claim 10 wherein the audio is packed onto a separate cable.

12. The system of claim 1 wherein the at least one hub sends audio and input data from the terminals to the multiplexer and the multiplexer reverses the process for audio to deliver the audio and input data to the individual user sessions.

13. The system of claim 10 where an audio stream to a specific user is independently stopped and started via a command sent to the at least one hub.

14. The system of claim 10 wherein the CEC pin on the HDMI connector on the terminal is used for forward and reverse audio.

15. The system of claim 1 wherein the at least one hub and the at least one terminal are connected via at least one wireless protocol including wireless HDMI and WiGig.

16. A computer implemented method for packing display data from an image from a graphical processing unit into a single logical image capable of streaming to multiple simultaneous terminals, the steps comprising:

partitioning the image into at least one vertical strips at a multiplexer;

calculating a number of displays for the multiple simultaneous terminals that can fit within each vertical strip;

creating a display block associated with each individual terminal;

multiplexing the display blocks for each vertical strip via a round robin ordering by row, producing interleaved display blocks;

transmitting the vertical strips having interleaved display blocks to a hub having an integrated circuit;

demultiplexing the vertical strips into individual display blocks at the hub;

generating a timing for display signals for the individual terminals, wherein pixels are pulled out of the integrated circuit at a rate governed by the timing and used to drive a display signal for each of the individual terminals; and transmitting the display signal for each of the individual terminals to the individual terminal.

17. The computer implemented method of claim 16, wherein the multiplexing step multiplexes the display blocks for each vertical strip via a round robin ordering by row with padding at the end of each row, producing interleaved display blocks.

18. The computer implemented method of claim 16, wherein the multiplexing step multiplexes the display blocks for each vertical strip via a round robin ordering by sets of pixels per row with padding at the end of each row, producing interleaved display blocks.

19. The computer implemented method of claims 16, 17, or 18, further including the step transmitting a synchronization signal to the hub indicating when a packing sequence begins, wherein the multiplexing step multiplexes the display blocks for each vertical strip over two or more frames, producing interleaved display blocks and a resulting frame rate that is an integer fraction of the image from the graphical processing unit.

20. The computer implemented method of claim 16, wherein the display blocks are not the same resolution.

21. The computer implemented method of claim 16, wherein the bit depth of the pixels in the interleaved display blocks is higher than the bit depth of the pixels in the individual display blocks.

* * * * *